US012675672B1

(12) United States Patent
Brown et al.

(10) Patent No.: US 12,675,672 B1
(45) Date of Patent: Jul. 7, 2026

(54) POSITIONLESS ENCODING FOR CLASSIFICATION AND ANALYSIS

(71) Applicant: CoreLogic Solutions, LLC, Irvine, CA (US)

(72) Inventors: Taylor Bryant Brown, Euless, TX (US); Alireza Abdihamzehkolaei, Corinth, TX (US); Dhruvin Patel, Oxford, MS (US); Logan Parker, New York, NY (US)

(73) Assignee: CoreLogic Solutions, LLC, Irvine, CA (US)

( * ) Notice: Subject to any disclaimer, the term of this patent is extended or adjusted under 35 U.S.C. 154(b) by 64 days.

(21) Appl. No.: 18/990,180

(22) Filed: Dec. 20, 2024

Related U.S. Application Data

(60) Provisional application No. 63/620,705, filed on Jan. 12, 2024.

(51) Int. Cl.
G06N 3/0455 (2023.01)
G06N 3/09 (2023.01)

(52) U.S. Cl.
CPC ............. G06N 3/0455 (2023.01); G06N 3/09 (2023.01)

(58) Field of Classification Search
CPC ......... G06N 20/00; G06N 3/0455; G06N 3/09
See application file for complete search history.

(56) References Cited

U.S. PATENT DOCUMENTS 8,930,334 B2 1/2015 Gerstner et al.
2023/0394034 A1* 12/2023 Dua .................... G06Q 30/0278

OTHER PUBLICATIONS

Yazdani et al., Real Estate Property Valuation using Self-Supervised Vision Transformers, arXiv:2302.00117v1, Jan. 31, 2023, 22 pages (Year: 2023).*
Dufter et al., Position Information in Transformers: An Overview, arXiv:2102.11090v2, Sep. 9, 2021, 24 pages (Year: 2021).*
Kazemnejad et al., The Impact of Positional Encoding on Length Generalization in Transformers, arXiv:2305.19466v2, Nov. 6, 2023, 36 pages (Year: 2023).*
Lee et al., Set Transformer: A Framework for Attention-Based Permutation-Invariant Neural Networks, arXiv: 1810.00825v3, May 26, 2019, 17 pages (Year: 2019).*
Karpathy, Andrej, The Unreasonable Effectiveness of Recurrent Neural Networks, May 21, 2015, 21 pages (Year: 2015).*

(Continued)

*Primary Examiner* — Daniel T Pellett
(74) *Attorney, Agent, or Firm* — KNOBBE, MARTENS, OLSON & BEAR, LLP

(57) ABSTRACT

A system may receive a request to determine an information item associated with a plurality of media received from a requesting system. The plurality of media may be unordered positionless media. The system may generate a multi-media embedding comprising information from each media item of the plurality of media. The system may determine the information item based on the multi-media embedding using a machine learning model configured to process information from unordered positionless media. The machine learning model may be acausal and may be prevented from applying an ordering or position to a portion of the multi-media embedding.

18 Claims, 5 Drawing Sheets

(56) References Cited

OTHER PUBLICATIONS

Bordes et al., Translating Embeddings for Modeling Multi-relational Data, *Advances in Neural Information Processing Systems* (NIPS 26), 2013.

Socher et al., Parsing Natural Scenes and Natural Language with Recursive Neural Networks, Computer Science Department, Stanford University, *Appearing in Proceedings of the 28th International Conference on Machine Learning*, Bellevue, WA, USA, 2011.

* cited by examiner

300

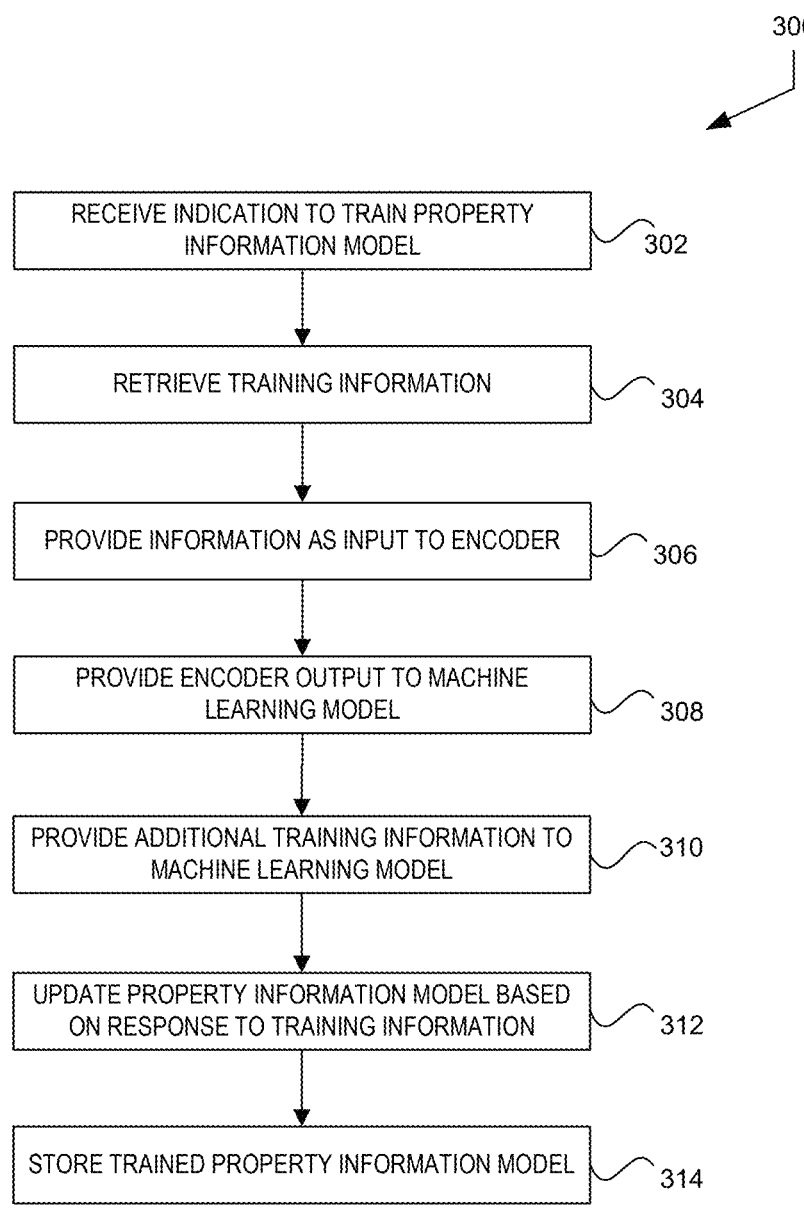

RECEIVE INDICATION TO TRAIN PROPERTY INFORMATION MODEL — 302

RETRIEVE TRAINING INFORMATION — 304

PROVIDE INFORMATION AS INPUT TO ENCODER — 306

PROVIDE ENCODER OUTPUT TO MACHINE LEARNING MODEL — 308

PROVIDE ADDITIONAL TRAINING INFORMATION TO MACHINE LEARNING MODEL — 310

UPDATE PROPERTY INFORMATION MODEL BASED ON RESPONSE TO TRAINING INFORMATION — 312

STORE TRAINED PROPERTY INFORMATION MODEL — 314

*Fig. 3*

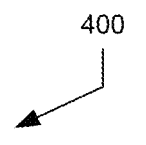
400
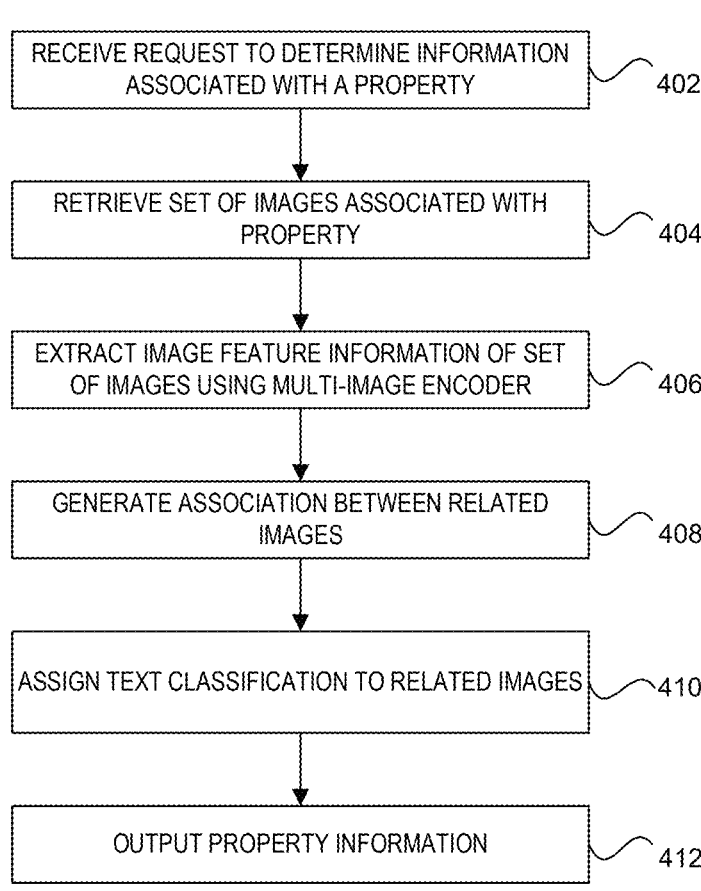
RECEIVE REQUEST TO DETERMINE INFORMATION ASSOCIATED WITH A PROPERTY        402
RETRIEVE SET OF IMAGES ASSOCIATED WITH PROPERTY        404
EXTRACT IMAGE FEATURE INFORMATION OF SET OF IMAGES USING MULTI-IMAGE ENCODER        406
GENERATE ASSOCIATION BETWEEN RELATED IMAGES        408
ASSIGN TEXT CLASSIFICATION TO RELATED IMAGES        410
OUTPUT PROPERTY INFORMATION        412
*Fig. 4*

POSITIONLESS ENCODING FOR CLASSIFICATION AND ANALYSIS

CROSS-REFERENCE TO RELATED APPLICATIONS

This application claims priority under 35 U.S.C. § 119 (e) to U.S. Provisional Application No. 63/620,705, filed Jan. 12, 2024, and titled "POSITIONLESS ENCODING FOR CLASSIFICATION AND ANALYSIS," which is hereby incorporated by reference herein in its entirety.

BACKGROUND

Computing systems can analyze input information to generate classification or condition information for real estate properties. In some implementations, a machine learning model will process a series of individual images for a property, and then combine the output generated for each image to provide an overall condition score for the property. The images may be labeled, for example by a manual labeling service, to identify a property location associated with each image, and to provide additional contextual information useful for the machine learning model. For example, a property owner may provide images of the inside and outside of the property to a real estate listing service. The real estate listing service may then engage a manual labeling service to have employees associate various labels with the images. The images and their associated labels may then be provided individually as input to a machine learning model to generate a condition score for the property.

SUMMARY

In some aspects, the techniques described herein relate to a system including: a computer-readable memory that store computer-executable instructions; a multi-media encoder configured to generate a multi-media embedding based on an input plurality of media associated with an object; and one or more processors in communication with the memory, where the computer-executable instructions, when executed by the one or more processors, causes the one or more processors to at least: retrieve training information including the plurality of media and a plurality of text information associated with the media, where the text information indicates an object information item, where the plurality of media is unordered, and where the plurality of media lacks position information; generate, by the multi-media encoder, a multi-media embedding based on at least a portion of the plurality of media; provide the multi-media embedding as input to a machine learning model configured to determine object information based on the multi-media embedding, where the machine learning model is configured to maintain information of the embedding as positionless, and where the machine learning model is configured to maintain information of the embedding as unordered; compare the determined object information to a text information of the plurality of text information associated with the portion of the plurality of media; based on the comparison of the determined object information to the text information, adjust a parameter of the machine learning model; store the machine learning model.

The system of the preceding paragraph can include any sub-combination of the following features: where the machine learning model is a transformer-based machine learning model; where the plurality of media includes at least one of: textual media, video media, audio media, or image media; where the object is a property; where the computer-executable instructions, when executed, further cause the one or more processors to: receive, from a requesting system, a request to determine a second object information associated with a second object; retrieve a second plurality of media associated with the second object, where the second plurality of media is unordered, where the second plurality of media lacks position information, and where the second plurality of media is associated with the second object; generate, by the multi-media encoder, a second multi-media embedding based on at least a portion of the second plurality of media; determine the second object information associated with the second object based on the second multi-image embedding using the machine learning model to generate a response, where the response includes the second object information; and provide the response to the requesting system; where to retrieve the training information, the computer-executable instructions, when executed, further cause the one or more processors to: transmit a request for the plurality of media and the plurality of text information to a content source; receive the plurality of media and the plurality of text information from the content source; where the machine learning model is a neural network machine learning model, where the machine learning model includes a first node, where the machine learning model includes a second node, and where to adjust the parameter of the machine learning model the computer-executable instructions, when executed by the one or more processors, causes the one or more processors to update a weight of a connection between the first node and the second node.

Another aspect of the disclosure provides a method including: receiving, from a requesting system, a request to determine a property information associated with a property and a plurality of media, where the plurality of media is associated with the property, where the plurality of media lacks position information, and where the plurality of media is unordered; generating, by a multi-media encoder, a multi-media embedding based on the plurality of media; determining the property information associated with the property using a machine learning model configured to generate a response based on a multi-media embedding, where the multi-media embedding is generated based on unordered positionless media information, where the machine learning model operates on acauasal information, and where the response includes the determined property information; providing the response to the requesting system.

The method of the preceding paragraph can include any sub-combination of the following features: where the property information is at least one of: Uniform Appraisal Dataset condition rating, a number of rooms, a housing style, a storm damage assessment, a determination of a condition of a foundation, a roof type, an approximate square footage, a number of stories of a building, a quality score, a property rating metric used by one or more businesses, a foundation type, an approximate age of a building, or a facing type; where the plurality of media is associated with a media type, and where the media type is one of: video, audio, image, or text; where the method further includes: retrieving training information including a second plurality of media and a plurality of text information associated with the second plurality of media, where the text information indicates a training property information item, where the second plurality of media is unordered, and where the second plurality of media lacks position information; generating, by the multi-media encoder, a second multi-media embedding based on at least a portion of the second plurality of media; providing the second multi-media embedding as input to the machine learning model to generate a second response, the second response including second determined property information; comparing the second determined property information to a text information of the plurality of text information associated with the portion of the plurality of media; based on the comparison of the second determined property information to the text information, adjusting a parameter of the machine learning model; storing the machine learning model; where the machine learning model is a neural network machine learning model, where the machine learning model includes a first node, where the machine learning model includes a second node, and where adjusting the parameter of the machine learning model includes adjusting a weight of a connection between the first node and the second node; where the method further includes: associating the determined property information with the property; and storing the determined property information and the association between the determined property information and the property. where the multi-media encoder includes a plurality of media encoders, and where the multi-media embedding is generated based at least in part on a plurality of outputs of the plurality of media encoders.

Another aspect of the disclosure provides a non-transitory, computer-readable medium encoded with computer-executable instructions executable by a processor of a computing device, where the computer-executable instructions, when executed by the processor, cause the computing device to: receive, from a requesting system, a request to determine a property information associated with a property; determine the property information associated with the property based on a multi-image embedding using a machine learning model configured to generate a response based on the multi-image embedding, where the multi-image embedding includes unordered positionless image information, where the machine learning model is configured to operate on acausal information, and where the response includes the property information; and provide the response to the requesting system.

The computer-implemented method of the preceding paragraph may include any sub-combination of the following features: generate, by a multi-image encoder, the multi-image embedding based on a plurality of images associated with the property; where the multi-image encoder includes a plurality of image encoders, where the plurality of image encoders generate a plurality of image embeddings, and where the multi-image encoder is configured to generate the multi-image embedding based on the plurality of image embeddings; where the request includes a sample image representative of the property information, and where the response includes a matching property associated with the property information; where the response further includes an indication of a confidence in the determined property information; where the property information is at least one of: Uniform Appraisal Dataset condition rating, a number of rooms, a housing style, a storm damage assessment, a determination of a condition of a foundation, a roof type, an approximate square footage, a number of stories of a building, a quality score, a property rating metric used by one or more businesses, a foundation type, an approximate age of a building, or a facing type.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 3 is a flow diagram of an illustrative routine for training a multi-image analysis model according to some embodiments.

FIG. 4 is a flow diagram of an illustrative routine for determining condition information for a property using a multi-image analysis model according to some embodiments.

DETAILED DESCRIPTION

Figure 1:
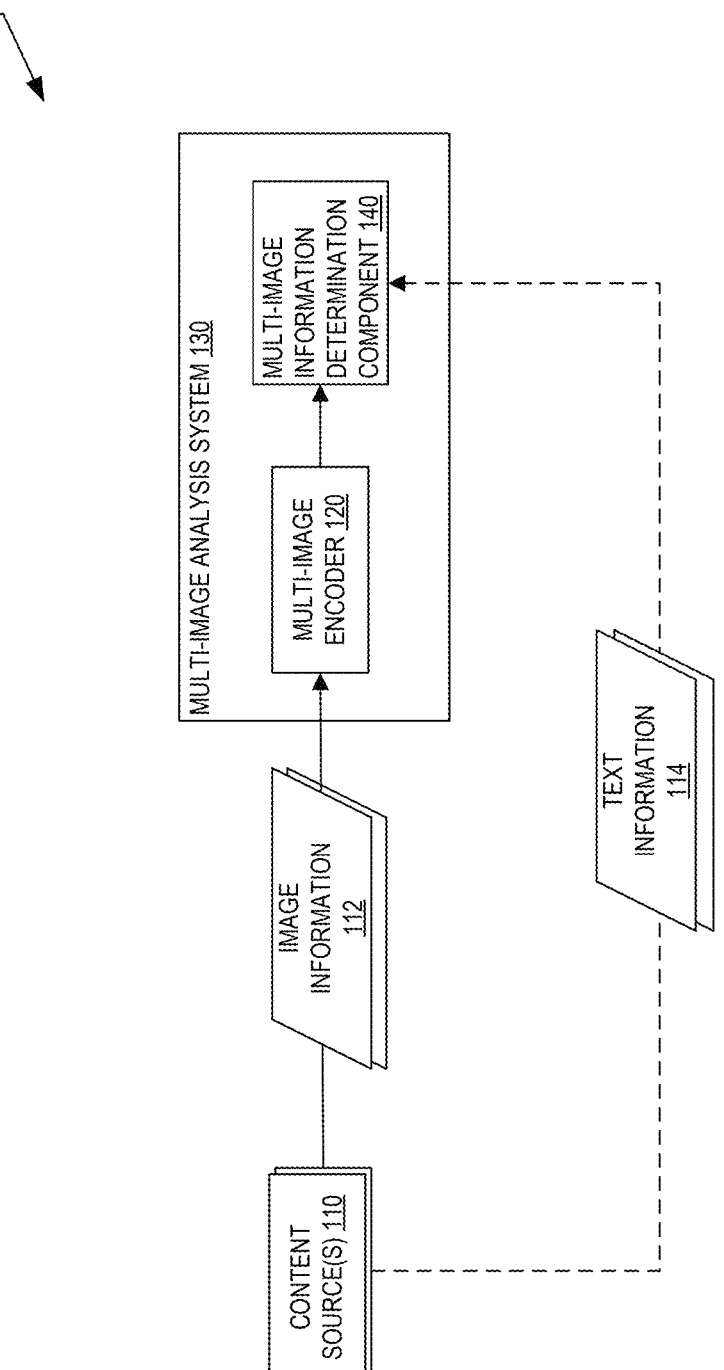
FIG. 1 is a block diagram of an illustrative system for determining information from a plurality of images according to some embodiments.

The present disclosure relates to enabling the analysis of media associated with a property to determine property information using a machine learning model. The present disclosure further relates to enabling search of media associated with multiple properties, to identify properties having similar features.

Some conventional systems allow for the determination of individual elements of property information (e.g., damage, bathroom type, housing style, etc.) based on images of a property. For example, an image of the roof of a house may be used to determine a roof type of the property. Such conventional systems may use a machine learning model to determine the property information. For example, a machine learning model may be trained to identify a roof type based on the image of the roof provided to the machine learning model as input. In another example, a machine learning model of a conventional system may be trained to accept a limited number (e.g., one to five) of images to determine the property information. To enable the conventional machine learning model to determine the roof type, additional information will be provided (e.g., metadata, manual labels, etc.) with the images indicating an ordering and/or a position of the images. The conventional machine learning model may associate the position or ordering of the images with the image information as part of the process of converting the image information into embeddings used by the machine learning model. While some conventional systems may be capable of processing multiple images provided, in an ordered or unordered manner, together as part of a set of images, such multi-image systems present additional problems. Some such conventional systems may require the use of multiple models where each model is specialized for a particular type of property information. For example, a first model may be trained to identify and label room types, and a second model may be trained to determine whether images labeled as a room type are the same or different rooms (e.g., whether two images labeled as "bathroom" are of the same or different bathrooms). Conventional multi-model systems may be inefficient, requiring significant computing resources at each stage of processing in addition to requiring different types of training for each machine learning model. Alternatively, some conventional systems may use a single model that processes images individually. In such conventional systems, positional information may be lost due to the individualized processing of images without the context of additional related images.

Such conventional systems present several problems. For example, where images need to be ordered before being provided to the machine learning model, manual ordering may be required. This manual ordering can be both time consuming, and may lead to errors when a human operator incorrectly orders the images. In a further example, where conventional machine learning models require position metadata, or other position information, to be provided as part of the input along with the property images, this may require additional computational resources to perform the embedding generation for the machine learning model, as the embedding information comprises a positional embedding. Additionally, in order to include such positional information in the embedding information for an image, each image may be processed individually by an encoder to generate the embedding. Such ordered generation of embeddings by the encoder may be time consuming, as the encoder may be configured to process the images serially to maintain the order information.

Further, such conventional systems may be limited in the number of images they can process to generate property information. Providing too many images to such machine learning models may lead to a reduction in the accuracy of the derived property information, as the machine learning model is unable to maintain relative position information, or to combine the image embeddings into a single embedding representing the property or portion of the property represented in the images. When the machine learning model is provided with too many images, this inability to combine the embeddings, or maintain relative location information, may result in derived property information being incorrect based on the misattribution of the image location. For example, a conventional system may be provided with twenty images of a roof, where the roof has a single storm damage location. Multiple images may each show the storm damage location from varying viewpoints and positions, based on where the images were taken (e.g., during a flyover of a camera drone, and from a person walking on the roof to assess damage). The conventional system must then process the positional information in the image embeddings, or derive such positional information (e.g., based on a masking of the embeddings) during the determination of the damage to the roof in order to ensure the storm damage is determined to be in a single location. However, such conventional systems may struggle to maintain this relative position information during the determination process, leading to the roof being assessed as having additional damage (e.g., the storm damage is assessed as being in a plurality of locations).

Where positional or ordering information is not provided to a conventional system, the system may not be able to determine whether similar images represent a same location, or a plurality of different locations. For example, a conventional system may be provided with fifty images of the inside of a house and be asked to determine the number of bathrooms in the house. However, multiple images may be of a same bathroom, and some images may be, for example, of a tiled laundry area having a sink, a kitchen sink, or other viewpoints which may not be immediately recognizable as not being a bathroom. Without being provided positional information, such conventional systems may count multiple images from various viewpoints of a same bathroom as being multiple bathrooms. Further, without an understanding of the relative position of the images, the sink in the tiled laundry room may be misidentified as being part of a bathroom. This may lead conventional systems to be unable to perform such determinations. In some embodiments, manual labeling may be used to provide the positional information of the images to the machine learning model. However, such labeling is time-consuming, and may provide limited advantages to having the manual labeler identify the number of bathrooms during labeling.

Some aspects of the present disclosure address some or all of the issues noted above, among others, by providing a system for receiving unordered positionless media information associated with a property, and determining property information based on the media. As used herein, positionless media may refer to the media having no metadata, labeling, or other indication of an absolute or relative position relative to other media, and/or the property with which the media is associated. Unordered, as used herein, may refer to the media being provided to the system without a fixed order, and/or without a requirement for the media to be provided to the system in a fixed order. For example, unordered media is not ordered such that media representing the front of the house is provided to the system first, and media representing the back of the house is provided to the system last, as may be required in some conventional systems. However, unordered positionless media may still have an association maintained within the system to identify which property the media is associated with generally, such that any property information determined by the system may be tied back to the property represented by the media.

In some embodiments, the system includes a machine learning model, such as a transformer-based machine learning model, which does not use position information. For example, the encoder of the machine learning model, used to generate embeddings for the model, does not include a positional encoder. As there is no positional encoding performed, position information which may be included in the media is not used to make determinations by the machine learning model. Further, the encoder of the machine learning model of the present disclosure may generate a multi-image embedding, representing information from each input media. The multi-image embedding may then be used by the machine learning model to determine property information.

The machine learning model of the present disclosure may be trained based on a set of unordered, positionless input media representing one or more objects, such as properties. The training data set may have text, or other, indications of object information represented by the training data (e.g., a set of training data may be configured to train the model to identify storm damage to a house). Generating the training data may be significantly faster as compared to training data for conventional systems. While the training data is associated with labels indicating damage types, or other object information, there is no need for manual ordering of the training data. Further, there is no need to associate positional information with the training data, or to ensure accuracy of positional information which is already included in the training data, as positional information will be removed from the training data during the generation of the multi-image embedding. Further, any positional information which may inherently be included in the embedding will be ignored by the machine learning model, as the machine learning model is prevented from using causal masking to assign position information or an ordering to the input information. In this way, the machine learning model is acausal, which as used herein means that the machine learning model does not apply causal masking, and/or additional ordering information, on the media information processed to generate an output.

The above-described aspects of the presented disclosure provide various advantages over conventional systems, as will be discussed now. One advantage of the present disclosure over the previously described conventional systems is that training data, and data used by a trained model to determine property information, does not require a time-consuming ordering and/or labeling process. Media may be provided to the system unordered, and the machine learning model can still derive property information based on the multi-image embedding generated from the unordered set of media. Further, avoiding the need for manual labeling of media reduces the risk that human-induced error will lead to faulty determinations by the machine learning model.

Additionally, generating the multi-image embedding allows for parallel generation of an embedding from input media, as opposed to the serial generation of embeddings described above in conventional systems. Such parallel embedding generation may improve the speed with which the system is able to generate property information for a property.

As an example, the machine learning model of the present disclosure may be provided with an unordered set of images of a house located on a property, and be expected to provide a condition score according to the Uniform Appraisal Dataset condition ratings. The encoder of the machine learning model may then generate a multi-image embedding for the house based on the images, and provide the multi-image embedding to a neural network of the machine learning model previously trained to generate condition ratings based on multi-image embeddings. The machine learning model may then provide a condition rating (e.g., a C3 rating indicating improvements are well maintained) as output. Advantageously, no labeling or ordering of the input images of the house need to be applied, or provided to the machine learning model, enabling rapid determination of condition ratings for multiple properties based on images.

Additional aspects of the present disclosure relate to allowing for search functionality based on multi-image embeddings associated with properties. For example, a user may provide an image of a kitchen style. The system may then convert the user-provided image into an embedding. The system may then use the embedding to search for similar features in a set of stored multi-image embeddings, in order to identify properties with kitchens similar to the kitchen style in the user-provided image. The identified properties may then be provided as a response to the user, for example in a list. While an image is described as the user input in this example, it should be understood that text, or other media (e.g., audio) may be provided by the user to the system as part of a search request. The system may then, for example, identify a representative image associated with the user input to enable search of the multi-image embeddings for the requested feature.

As used herein, the term "property information" may refer to any information which may be derived from media, and associated with a property. For example, a Uniform Appraisal Dataset condition rating, a number of rooms, a housing style (e.g., retro, mid-century modern, bungalow, etc.), a storm damage assessment, a determination of the condition of a foundation, a roof type, a facing type (e.g., stone, brick, stucco, etc.), an approximate square footage, a number of stories of a building, a quality score, a property rating metric used by one or more businesses, a foundation type, an approximate age of a building, a projected replace-ment date for at least a portion of a property (e.g., siding, roof, column, etc.), a condition of a portion of a building, identification of and other information associated with an accessory dwelling unit, and the like.

The term "model," as used in the present disclosure, can include any computer-based models of any type and of any level of complexity, such as any type of sequential, functional, or concurrent model. Models can further include various types of computational models, such as, for example, artificial neural networks ("NN"), transformer-based models (e.g., GPT models), language models (e.g., large language models ("LLMs")), artificial intelligence ("AI") models, machine learning ("ML") models, multi-modal models (e.g., models or combinations of models that can accept inputs of multiple modalities, such as images and text), and/or the like.

While certain aspects and implementations are discussed herein with reference to use of a transformer-based model, and/or AI, those aspects and implementations may be performed by any other transformer-based model, language model LLM, AI model, generative AI model, generative model, ML model, NN, multimodel model, and/or other algorithmic processes. Similarly, while certain aspects and implementations are discussed herein with reference to use of a ML model, those aspects and implementations may be performed by any other AI model, generative AI model, generative model, NN, multimodel model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the transformer-based models and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

While images are referred to throughout the disclosure herein, it should be understood that the use of the term images is exemplary only, and that the systems and methods of the present disclosure may be used in conjunction with any type of media, including videos, audio, text, point clouds, depth maps, neural radiance fields, other mathematical objects representing real-world conditions or information, and/or multi-media information (e.g., a video with an associated audio track).

Various aspects of the disclosure will be described with regard to certain examples and embodiments, which are intended to illustrate but not limit the disclosure. Although aspects of some embodiments described in the disclosure will focus, for the purpose of illustration, on particular examples of media, machine learning models, and the like, the examples are illustrative only and are not intended to be limiting. In some embodiments, the techniques described herein may be applied to additional or alternative types of media, machine learning models, and the like. Additionally, any feature used in any embodiment described herein may be used in any combination with any other feature or in any other embodiment, without limitation.

Example Multi-Image Assessment Environment

With reference to an illustrative example, FIG. 1 shows an example environment 100 for training a machine learning model to perform simultaneous analysis of multiple images to assess property information. The environment 100 includes at least one content source 110, and a multi-image analysis system 130.

The multi-image analysis system 130 includes a multi-image encoder 120, and a multi-image information component 140. The multi-image analysis system 130 allows for the training of the multi-image information component 140 using image information 112, and in some embodiments text information 114. The multi-image analysis system 130 further allows for the generation of property information (e.g., a condition score) for a property based on received image information 112.

The content source 110 may be a storage location configured to store images of a property as image information 112, and in some embodiments text information 114 associated with the property, which may be useful for training a machine learning model. In some embodiments, a plurality of content sources 110 may provide image information 112, and/or text information 114 to the multi-image analysis system 130. As discussed previously herein, while references are made to images and text here, the content source 110 may store video, audio, and/or any other information type. The text information 114 may be useful for training a machine learning model of the multi-image information component 140, and may provide additional contextual information associated with a property for which image information 112 is being provided by the content source 110 to the multi-image information component 140. In some embodiments, image information 112 stored by the content source 110 may be positionless, meaning that position information indicating a spatial relationship or ordering between images represented by the image information 112 is removed. For example, when the content source 110 stores an image of a front of a house, and an image of a back of a house, metadata indicating that there is an order to the images, or a spatial relationship between the images, may be removed or not stored by the content source 110.

The multi-image encoder 120 is an encoder configured to generate a representation of the image information 112 received from the content source 110 suitable for input to a machine learning model of the multi-image information component 140, for example in the form of one or more embeddings. An embedding generated by the multi-image encoder 120 may be a lower-dimensional vector representation of the image information 112 received by the multi-image encoder 120. The lower-dimensional space (e.g., embedding space) in which the image information 112 is represented by the multi-image encoder 120 may be a shared embedding space with text information 114, or any other type of information with which the image information 112 is to be associated. An embedding output by the multi-image encoder 120, in the present disclosure, will not contain positional information, or any other location information which may indicate an order or position of one image relative to another image provided to the multi-image encoder 120. Additionally, in some embodiments, the multi-image encoder 120 may remove positional information, such that embeddings generated by the multi-image encoder 120 are positionless. Providing positionless embeddings may assist in the training and use of a machine learning model of the multi-image information component 140, where position information may negatively affect the performance and accuracy of the multi-image information component 140.

Additionally, the multi-image encoder 120 may be a single encoder, or a plurality of encoders. Where the multi-image encoder 120 includes a plurality of encoders, the multi-image encoder 120 may be further configured to combine the embeddings output by the plurality of encoders into a single multi-image embedding which comprises information from each embedding.

The multi-image information component 140 is configured to provide a machine learning model, for example a transformer-based machine learning model, which uses positionless image information 112 in the form of a positionless multi-image embedding generated by the multi-image encoder 120, and/or text information 114 to determine information for a property associated with the image information 112, as described in further detail in relation to FIG. 4 below herein. Further, the multi-image information component 140 may be configured to allow for the training of the machine learning model, as will be described in further detail in relation to FIG. 3 below herein.

Figure 2:
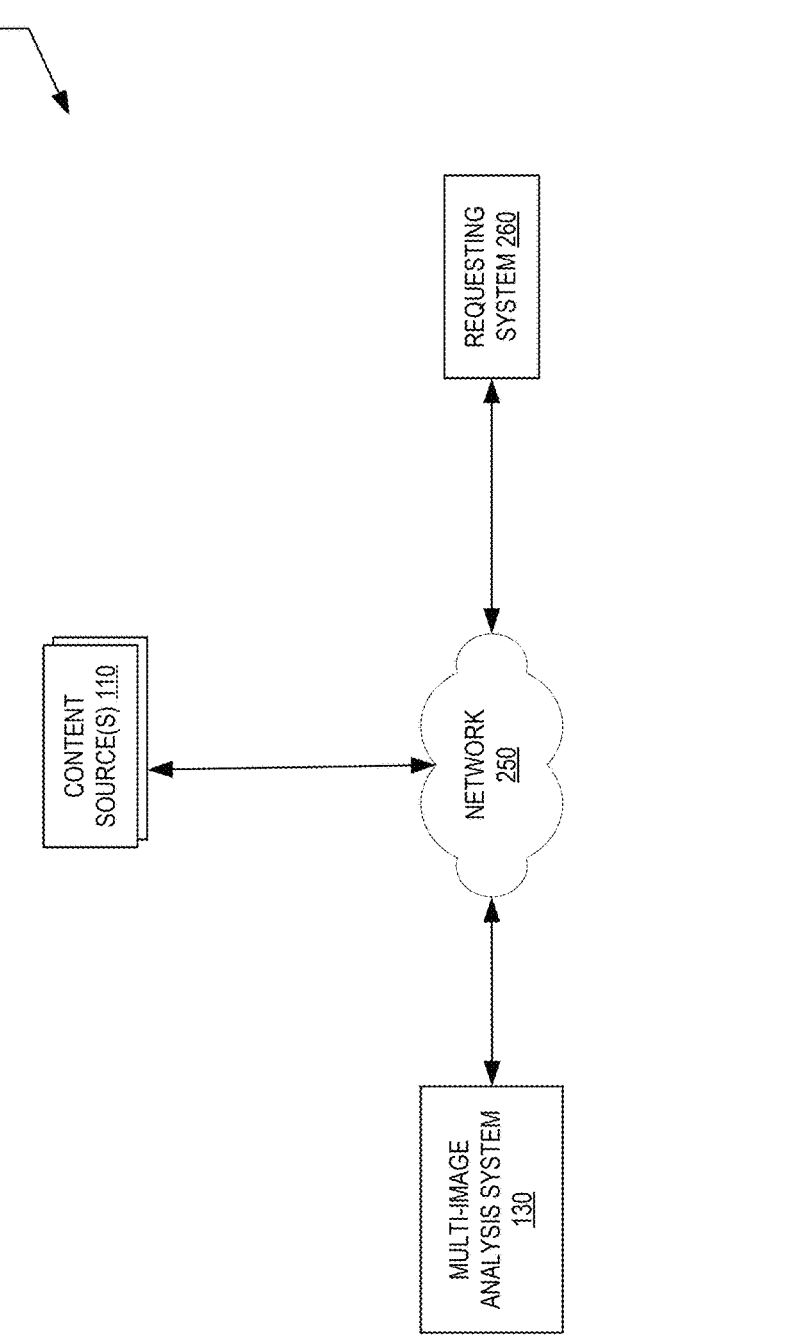
FIG. 2 is a block diagram of illustrative data flows within a system for determining information from a plurality of images according to some embodiments.

With reference to an illustrative example, FIG. 2 shows an example environment 200 for providing property information to a requesting system 260 using a multi-image analysis system 130.

The environment 200 of this example includes at least one content source 110, a multi-image analysis system 130, a requesting system 260, and a network 250.

The network 250 may be a publicly-accessible network of linked networks, some or all of which may be operated by various distinct parties, for example the Internet. In some cases, network 250 may include a private network, personal area network, local area network, wide area network, cellular data network, satellite network, etc., or some combination thereof, some or all of which may or may not have access to and/or from the Internet.

The content source 110 is a system configured to store information associated with a property (e.g., image information 112, text information 114, video information, audio information, etc.) as described previously herein.

The multi-image analysis system 130 is a system configured to provide property information (e.g., a condition, damage assessment, condition score, spatial information, etc.) associated with a property, for example in response to a request received from a requesting system 260. In some embodiments, the multi-image analysis system 130 may be configured to enable search functionality. In such embodiments, the multi-image analysis system 130 may receive, for example, a text description of a property element (e.g., kitchen style, housing style, number of bedrooms, house size, etc.). Alternatively, the multi-image analysis system 130 may receive image information, or another information type, to be used for searching for a property element. The information provided by the multi-image analysis system 130 may be based on image information 112, or other information, received from a content source 110. In some embodiments, the multi-image analysis system 130 may be further configured to train a machine learning model used to provide the property information. Further, as described above, the multi-image analysis system 130 may be configured to remove position and/or ordering information from information received from the content source 110.

The requesting system 260 may be a computing system configured to provide a request for property information to the multi-image analysis system 130. The requesting system

260 may be associated with a user, and the user may further be associated with a content source 110 providing information to the multi-image analysis system 130 from which property information will be determined.

Figure 5:
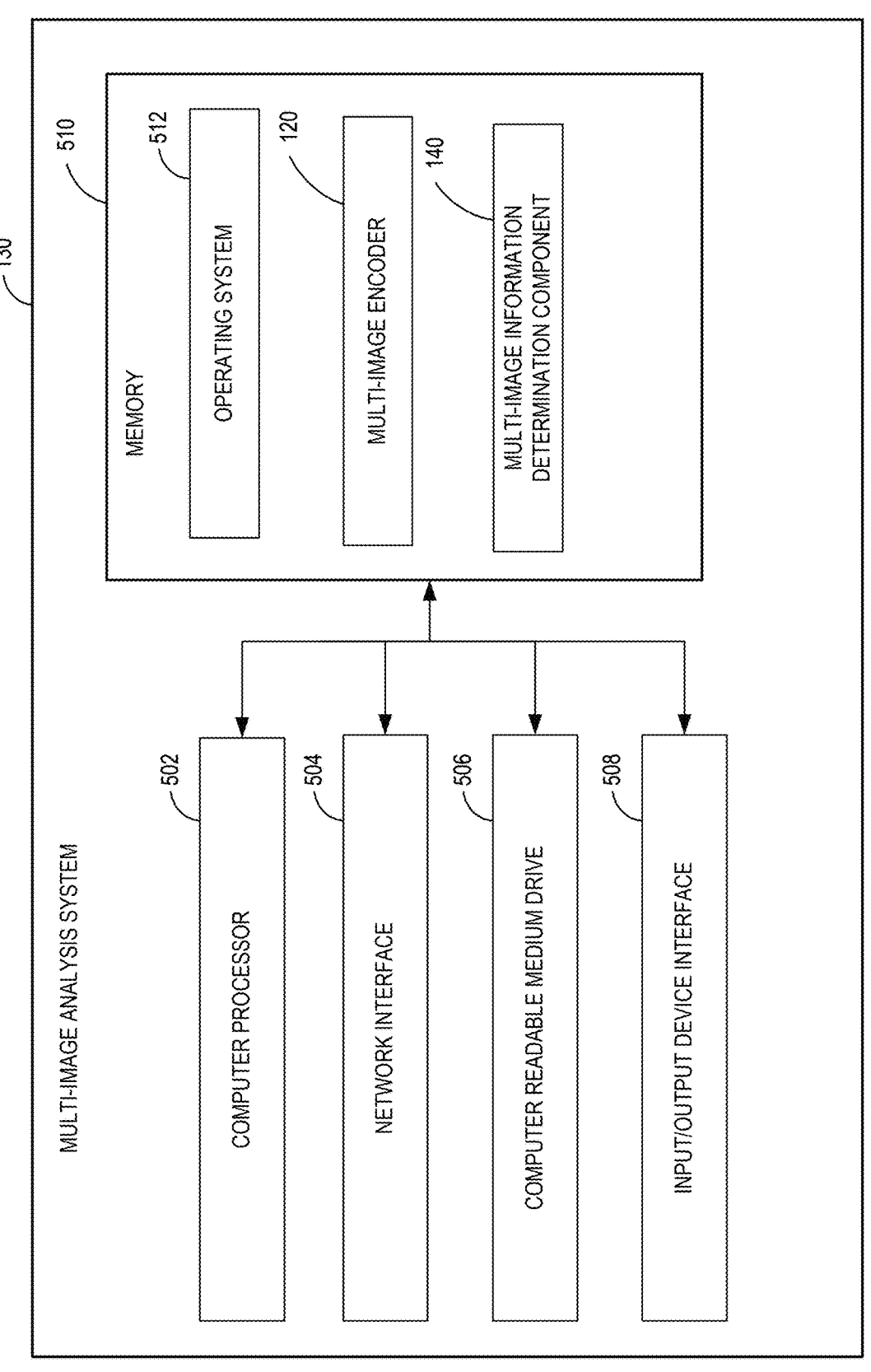
FIG. 5 is a block diagram of an illustrative computing system configured to analyze media to determine a property condition according to some embodiments.

Example Property Information Model Training and Property Information Generation Routines When a routine described herein (e.g., routine 300, and 400) is initiated, a set of executable program instructions stored on one or more non-transitory computer-readable media (e.g., hard drive, flash memory, removable media, etc.) may be loaded into memory (e.g., random access memory or RAM) of a computing device, such as the multi-image analysis system 130 shown in FIG. 5, and executed by one or more processors. In some embodiments, the routine 300, and 400, or portions thereof may be implemented on multiple processors, serially or in parallel.

Routines described herein may refer, in part, to an order of operations, blocks, or steps. It should be understood that any reference to an order of the blocks of a routine is intended to aid in the explanation of the routine only, and does not imply that such an order is required for performing the operation described by the routine. Blocks of the routines described herein, therefore, should be understood to be capable of being performed before, after, and/or simultaneously with any other block of the routine. Additionally, various blocks of routines described herein may be performed repeatedly even where no loop is explicitly shown. Such loops may be excluded from the description of a routine for the purpose of clarity, and does not require that a block be performed only once before the routine proceeds.

FIG. 3 illustrates example routine 300 for training a property information model (e.g., a machine learning model of the multi-image analysis system 130). The routine 300 begins at block 302 in response to receiving an indication to train the property information model. For example, the indication may be a request received by the multi-image analysis system 130 from a requesting system 260 to train a machine learning model to analyze images of a property and generate a condition score for the property.

At block 304, the multi-image analysis system 130 retrieves training information to be used to train the property information model. For example, the multi-image analysis system 130 may transmit a request for image information 112 and text information 114 associated with the image information 112 to a content source 110. In some embodiments, the multi-image analysis system 130 may request that the content source 110 provide positionless image information 112. Positionless image information 112, as discussed previously herein, is image information 112 which does not contain an indication of an ordering of the images represented by the image information 112 (e.g., a first image to be processed, a list of images to be processed, etc.). Further, positionless image information 112 does not indicate a position of a first image relative to a second image. Additionally, positionless image information 112 does not indicate a position of a first image relative to a point or area of a property represented by the first image (e.g., a label indicating the first image is of a roof of the property, the first image was taken from an upper level of the house, etc.). To provide positionless image information 112, the content source 110 may remove metadata associated with the image information 112 which may normally be provided by the content source 110. The content source 110 may further remove textual labels or other information embedded in the image information 112 which would otherwise be used to indicate position information for an image.

At block 306, the multi-image analysis system 130 provides the image information 112 retrieved from the content source 110 to the multi-image encoder 120. The multi-image encoder 120, as described previously herein, generates an embedding based on the image information 112. In some embodiments, the multi-image encoder 120 may include a plurality of image encoders, each configured to generate an image embedding in a shared embedding space. In such embodiments, the multi-image encoder 120 can then combine the outputs of the plurality of image encoders to generate a multi-image embedding. Alternatively, the multi-image encoder 120 may be a single encoder configured to generate a multi-image embedding from the image information 112. In some embodiments, the multi-image encoder 120 may further be configured to remove position information from the image information 112 and/or any embedding generated by the multi-image encoder 120 such that the output of the multi-image encoder 120 is a positionless embedding.

At block 308, the multi-image analysis system 130 provides the multi-image embedding generated by the multi-image encoder 120 to the multi-image information component 140. In some embodiments, the multi-image analysis system 130 may verify that the multi-image embedding is positionless before providing the embedding to the multi-image information component 140. If the multi-image embedding is determined not to be positionless, the multi-image analysis system 130 may remove position information (e.g., an ordering in which images of the image information 112 were processed to generate the multi-image embedding). Alternatively, the multi-image analysis system 130 may request the multi-image encoder 120 generate a new multi-image embedding which is positionless, for example by altering the image information 112 provided to the multi-image encoder 120.

At block 310, the multi-image analysis system 130 provides additional training information to the multi-image information component 140. The additional training information may be text information 114 associated with the image information 112. In some embodiments, where the property information model is being trained by the multi-image analysis system 130 to provide a condition indicator (e.g., a condition description, condition score, etc.) for a property, the text information 114 may be a textual description of the condition of the property represented by an image of the image information 112. For example, a first image of the image information 112 may show the roof of a property where the roof is missing a shingle. The text associated with the image may state "damaged roof, missing shingle." A second image may be of a different damaged roof, and be associated with text stating "damaged roof, wind damage." The multi-image embedding generated by the multi-image encoder 120 will include an embedding for each of the first image and the second image, and the text information text information 114 may then be associated with the embedding information representing the damaged roof. The property information model may then learn to associate the image information 112 of the other images with a damaged roof, such that the property information model will learn to describe different images of a damaged roof (the same roof or a different roof) in text as being damaged and/or missing a shingle. In some embodiments, the routine 300 may skip block 310, for example where additional training information is not needed.

At block 312, the property information model is updated based on its response to the input multi-image embedding (e.g., the model may be "trained"). The property information model may be updated by adjusting one or more parameters of the machine learning model. For example, weights connecting nodes in a neural network implementing the property information model may be updated. The updating of the property information model to generate a trained property information model may, for example, be accomplished by using image-text contrastive learning, supervised learning, self-supervised learning, unsupervised learning, contrastive language-audio pretraining, or any other type of machine model training or learning. Importantly, during updating of the model to perform training, the model will not be able to generate an ability to apply a causal mask, or other type of position or ordering information, to the information provided to the model, thereby maintaining the model information as positionless. Maintaining a positionless understanding of information for the property information model allows for the functionality described herein, including the ability of the property information model to perform assessment of a multi-image embedding to determine condition information, and other information, for a property.

At block 314, the trained property information model is stored, for example by the multi-image analysis system 130, for later use. In some embodiments, the trained machine learning model may be provided for storage at a remote location, for example in a storage location associated with a provider of machine learning models, and/or a storage location associated with a provider of property information.

FIG. 4 illustrates example routine 400 for determining property information based at least in part on a set of images, using a machine learning model. The routine 400 begins at block 402 where a request to determine information associated with a property is received by the multi-image analysis system 130, for example from a requesting system 260. The request may be for information about a specific property. Alternatively, the request may be for an identification of one or more properties meeting a property requirement. For example, the request may be for a condition score (e.g., a Condition Rating on the C6 scale), a damage assessment, a property square footage, a housing unit square footage, a number of a type for room (e.g., bathrooms, bedrooms, etc.), an identification of a housing feature (e.g., a fireplace, a mid-century modern housing style, a brick face, etc.), and the like. The request may be provided in text, as an image (e.g., as a request to search for images of similar properties or properties having similar features), or in a multi-media format (e.g., text and images, video and audio, etc.).

At block 404, the multi-image analysis system 130 retrieves a set of images associated with a property. For example, the multi-image analysis system 130 may request images from a content source 110 storing information for one or more properties maintained by a real estate listing service. In some embodiments, the multi-image analysis system 130 may retrieve additional property information, in additional formats, from the content source 110 which may be useful in determining the requested property information, and/or which may be provided to the requesting system 260 as part of the response (e.g., address information for the properties for which images were retrieved).

At block 406, the multi-image encoder 120 of the multi-image analysis system 130 extracts image features for the retrieved set of images to generate a multi-image embedding, as described previously herein.

At block 408, the multi-image information component 140 of the multi-image analysis system 130 generates associations between related images. Such associations may indicate that the related images represent a same property, or same part of a property. For example, related images may be determined to represent a same bathroom in a house, and the multi-image information component 140 may then, further in the routine 400, determine a condition of the same bathroom. Alternatively, such associations may indicate that the related images represent a same or similar feature (e.g., the images include a chimney, French doors, a pool, or any other property feature). The multi-image information component 140 may then determine that a particular feature is responsive to the request received by the multi-image analysis system.

At block 410, the multi-image information component 140 may assign a text classification to the related images. For example, the text classification may be a condition score, or a textual description of a feature common to the related images. In some embodiments, the multi-image information component 140 may be performing a search for properties having a particular housing feature, and may assign an address as a text label. In alternative embodiments, for example when a search is being performed for images showing a condition of a property but not for a determination of the property's condition, the multi-image information component 140 may not assign a text classification. Additionally, some embodiments may provide for assigning a video, image, audio, and/or multi-media classification to the related images.

At block 412, the property information determined by the machine learning model is output, for example to the requesting system 260. In some embodiments, the multi-image analysis system 130 may compile a set of text classifications assigned to related images, to generate property information to be output to the requesting system 260. For example, text classifications assigned to a set of related images may indicate that all images are related to a single property, and further indicate various damage types to the property. The multi-image analysis system 130 may then, for example using a machine learning model or rules-based system, determine a likelihood that a foundation is damaged, a roof will collapse, or other effect on the property related to the damage types indicated by the text classifications. In another example, the text classifications may indicate a number of rooms in a house, and the multi-image analysis system 130 may combine the text classifications to determine a number of bedrooms and bathrooms of the property. Additionally, the multi-image analysis system 130 may provide an indication of a confidence of determined property information, which may indicate a probability that determined property information is correct.

Execution Environment

FIG. 5 illustrates various components of an example multi-image analysis system 130 configured to implement various functionality described herein.

In some embodiments, the multi-image analysis system 130 may be implemented using any of a variety of computing devices, such as server computing devices, desktop computing devices, personal computing devices, mobile computing devices, mainframe computing devices, mid-range computing devices, host computing devices, or some combination thereof.

In some embodiments, the features and services provided by the multi-image analysis system 130 may be implemented as web services consumable via one or more communication networks. In further embodiments, the multi-image analysis system 130 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment In some embodiments, as shown, a multi-image analysis system 130 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; one or more input/output device interfaces 508; and one or more computer-readable memories 510, such as random access memory ("RAM") and/or other volatile non-transitory computer readable media.

The computer-readable memory 510 may include computer program instructions that one or more computer processors 502 execute and/or data that the one or more computer processors 502 use in order to implement one or more embodiments. For example, the computer-readable memory 510 can store an operating system 512 to provide general administration of the multi-image analysis system 130. As another example, the computer readable memory 510 can store a multi-image encoder 120. As another example, the computer-readable memory 510 can store a multi-image information component 140.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a non-transitory computer-readable memory that stores computer-executable instructions;
a multi-media encoder that generates a multi-media embedding based on a plurality of media associated with an object; and
one or more processors in communication with the computer-readable memory, wherein the computer-executable instructions, when executed by the one or more processors, causes the one or more processors to at least:
retrieve training information comprising the plurality of media and a plurality of text information associated with the plurality of media, wherein the text information indicates an object information item, wherein the plurality of media is unordered, and wherein the plurality of media lacks position information;
generate, by the multi-media encoder, a multi-media embedding based on at least a portion of the plurality of media, wherein the multi-media encoder comprises a plurality of image encoders that each generate a respective media embedding of a plurality of media embeddings in parallel, and wherein the multi-media encoder combines the generated media embeddings to generate the multi-media embedding;
provide the multi-media embedding as input to a machine learning model configured to determine object information based on the multi-media embedding, wherein the machine learning model is configured to maintain information of the multi-media embedding as positionless, and wherein the machine learning model is configured to maintain information of the multi-media embedding as unordered;
compare the determined object information to a text information of the plurality of text information associated with the portion of the plurality of media;
based on the comparison of the determined object information to the text information, adjust a parameter of the machine learning model;
store the machine learning model.

2. The system of claim 1, wherein the machine learning model is a transformer-based machine learning model.

3. The system of claim 1, wherein the plurality of media comprises at least one of: textual media, video media, audio media, or image media.

4. The system of claim 1, wherein the object is a property.

5. The system of claim 1, wherein the computer-executable instructions, when executed, further cause the one or more processors to:
receive, from a requesting system, a request to determine a second object information associated with a second object;
retrieve a second plurality of media associated with the second object, wherein the second plurality of media is unordered, wherein the second plurality of media lacks position information, and wherein the second plurality of media is associated with the second object;
generate, by the multi-media encoder, a second multi-media embedding based on at least a portion of the second plurality of media;
determine the second object information associated with the second object based on the second multi-media embedding using the machine learning model to generate a response, wherein the response comprises the second object information; and
provide the response to the requesting system.

6. The system of claim 1, wherein to retrieve the training information, the computer-executable instructions, when executed, further cause the one or more processors to:
transmit a request for the plurality of media and the plurality of text information to a content source; and
receive the plurality of media and the plurality of text information from the content source.

7. The system of claim 1, wherein the machine learning model is a neural network machine learning model, wherein the machine learning model comprises a first node, wherein the machine learning model comprises a second node, and wherein to adjust the parameter of the machine learning model the computer-executable instructions, when executed by the one or more processors, causes the one or more processors to update a weight of a connection between the first node and the second node.

8. A method comprising:
receiving, from a requesting system, a request to determine a property information associated with a property and a plurality of media, wherein the plurality of media is associated with the property, wherein the plurality of media lacks position information, and wherein the plurality of media is unordered;

generating, by a multi-media encoder, a multi-media embedding based on the plurality of media, wherein the multi-media encoder comprises a plurality of image encoders that each generate a respective media embedding of a plurality of media embeddings in parallel, and wherein the multi-media encoder combines the generated media embeddings to generate the multi-media embedding;

determining the property information associated with the property using a machine learning model configured to generate a response based on the multi-media embedding, wherein the multi-media embedding is generated based on unordered positionless media information, wherein the machine learning model operates on acausal information, and wherein the response comprises the determined property information;

providing the response to the requesting system.

9. The method of claim 8, wherein the property information is at least one of: Uniform Appraisal Dataset condition rating, a number of rooms, a housing style, a storm damage assessment, a determination of a condition of a foundation, a roof type, an approximate square footage, a number of stories of a building, a quality score, a property rating metric used by one or more businesses, a foundation type, an approximate age of a building, or a facing type.

10. The method of claim 8, wherein the plurality of media is associated with a media type, and wherein the media type is one of: video, audio, image, or text.

11. The method of claim 8, further comprising:

retrieving training information comprising a second plurality of media and a plurality of text information associated with the second plurality of media, wherein the text information indicates a training property information item, wherein the second plurality of media is unordered, and wherein the second plurality of media lacks position information;

generating, by the multi-media encoder, a second multi-media embedding based on at least a portion of the second plurality of media;

providing the second multi-media embedding as input to the machine learning model to generate a second response, the second response comprising second determined property information;

comparing the second determined property information to a text information of the plurality of text information associated with the portion of the plurality of media;

based on the comparison of the second determined property information to the text information, adjusting a parameter of the machine learning model; and storing the machine learning model.

12. The method of claim 11, wherein the machine learning model is a neural network machine learning model, wherein the machine learning model comprises a first node, wherein the machine learning model comprises a second node, and wherein adjusting the parameter of the machine learning model comprises adjusting a weight of a connection between the first node and the second node.

13. The method of claim 8, further comprising:

associating the determined property information with the property; and storing the determined property information and the association between the determined property information and the property.

14. The method of claim 8, wherein the multi-media encoder comprises a plurality of media encoders, and wherein the multi-media embedding is generated based at least in part on a plurality of outputs of the plurality of media encoders.

15. A non-transitory, computer-readable medium encoded with computer-executable instructions executable by a processor of a computing device, wherein the computer-executable instructions, when executed by the processor, cause the computing device to:

receive, from a requesting system, a request to determine a property information associated with a property;

generate, by a multi-image encoder, the multi-image embedding based on a plurality of images associated with the property, wherein the multi-image encoder comprises a plurality of image encoders, wherein the plurality of image encoders generate a plurality of image embeddings at least partly in parallel, and wherein the multi-image encoder is configured to generate the multi-image embedding based on the plurality of image embeddings;

determine the property information associated with the property based on a multi-image embedding using a machine learning model configured to generate a response based on the multi-image embedding, wherein the multi-image embedding comprises unordered positionless image information, wherein the machine learning model is configured to operate on acausal information, and wherein the response comprises the property information; and provide the response to the requesting system.

16. The non-transitory, computer-readable medium of claim 15, wherein the request comprises a sample image representative of the property information, and wherein the response comprises a property comprising a similar property information associated with the property information.

17. The non-transitory, computer-readable medium of claim 15, wherein the response further comprises an indication of a confidence in the determined property information.

18. The non-transitory, computer-readable medium of claim 15, wherein the property information is at least one of: Uniform Appraisal Dataset condition rating, a number of rooms, a housing style, a storm damage assessment, a determination of a condition of a foundation, a roof type, an approximate square footage, a number of stories of a building, a quality score, a property rating metric used by one or more businesses, a foundation type, an approximate age of a building, or a facing type.

*  *  *  *  *